Oct. 6, 1936.　　　R. B. LESLIE　　　2,056,927
QUICK CONNECTING DEVICE FOR SUCTION HOSE
AND FIRE HYDRANTS AND OTHER PURPOSES
Filed March 5, 1935
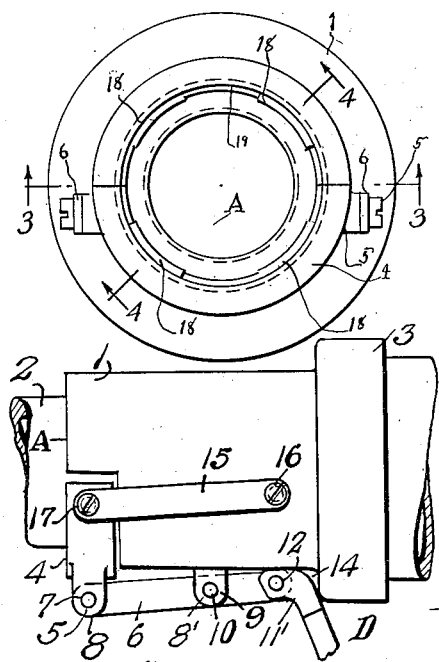
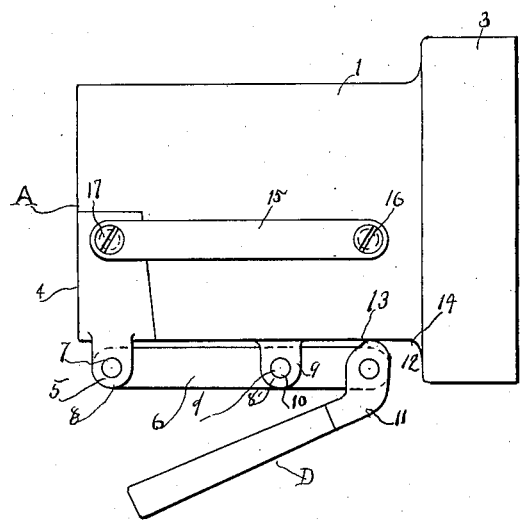
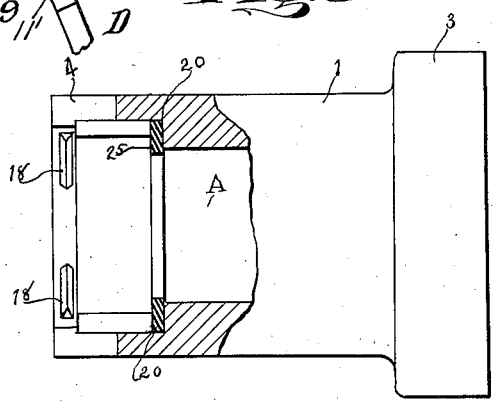
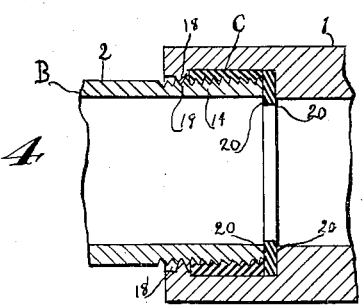
INVENTOR
Rolland B Leslie
BY F. N. Gillert
ATTORNEY Patented Oct. 6, 1936

2,056,927

UNITED STATES PATENT OFFICE 2,056,927

QUICK CONNECTING DEVICE FOR SUCTION HOSE AND FIRE HYDRANTS AND OTHER PURPOSES

Rolland B. Leslie, New Milford, Pa.

Application March 5, 1935, Serial No. 9,397

4 Claims. (Cl. 285—144)

My invention relates to improvements in a quick connecting means for fire hydrant and hose coupling, and for other liquid hose connections.

Among the novel or new methods or features of the invention are that its method of operation is secured by split jaw formation coupling and by means of a lever and cam connection.

My invention relates to an improvement in hydrant and hose method of connection and with this object in view my invention consists of certain novel features of construction and arrangement of parts as will be hereinafter fully described and pointed out in the claims, reference being had to the accompanying drawing in which:

Fig. 1 is a plan view of the upper mouth of the jaw coupling.

Fig. 2 is a side view of the split jaw coupling in closed position.

Fig. 3 is a side view partly in cross section of the jaw coupling.

Fig. 4 is a fragmentary view of the coupling in cross section.

Fig. 5 is a side view of the hydrant nozzle in connection with the jaw coupling in open position.

The same reference characters denote like parts in each of the several figures of the drawing.

In carrying out my invention I have the coupling member 1, which is to be united to the hydrant nipple 2. The coupling member 1 has the base expansion 3. The coupling member 1 has at its upper end the segment portion 4 which has projecting from the outer surface the bifurcated lug projection 5, having the arms 8. Mounted between the lugs is lever 6, pivoted at its upper end on the pin 7 which is mounted in the arms 8. This lever 6 at its lower portion is pivoted to the arm 8' of the lug 9, projecting from the outer surface of the member 1, and has pivotal connection at its lower end with the end 11' of the handle D which may be pivoted to lever 6 by the pin 12. The extreme end 11 of the handle D is formed with the cam portion 13. It will be seen that the lever is fulcrumed on the pivot 10 in the arms 8' of the lug 9 and pivotally connected by means of the pin 7 at its upper end to the segment 4. By manipulating the handle D, it will be obvious that the cam surface will engage the outer wall of the member 1, rock the lever 6 on its fulcrum 10 and thereby move the segment 4 toward the member 1, into the closed position of Fig. 1. The segment is held in this position by the camming action and/or friction. The segment 4 is secured to the member 1 by arms or links 15 on either side of the member 1. These arms are pivotally secured to the member 1 by the pivots 16 and to the segment 4 by the pivots 17. By means of these arms or links 15 the segment 4 moves bodily away from or toward the member 1 when the handle D is manipulated. In the operation of my device I have also a flexible disk ring C which at its lower edge has the inward projection which is designated as a shoulder 20, to form a seat on which the projection nipple B may rest when it is inserted in the opening A to form the coupling. This disc C forms in the coupling an important packing feature to render the coupling in the connection between the nipple B and the member 1 absolutely tight. In the operation of my device having reached the point where it is desired to connect the coupling between the hose member 1 and the hydrant nipple B and having mounted in the mouth of the hose member 5 the gasket C in its position I press down on the handle D and with the leverage connection C which immediately opens segment 4 and expands the mouth A of the hose mouth and allows the interior entry of the hydrant nipple into its position in the mouth of the hose coupling, and then by raising the handle D clamping it upward toward the side of the outer surface or member 1 and the segment 4, is pressed back into firm connection with it and surrounding and gripping the inserted hydrant nipple, a complete, tight impervious union and coupling, is made between the hose and the hydrant nipple and to be reopened and released and discontinued by the easy reverse movement of the handle D on the hose coupling in member 1.

Having thus described my invention, what I claim as new, and for which I desire Letters Patent is as follows:

1. In a quick connecting means for fire hydrant and hose couplings in combination on the hose coupling a body member having an opening therethrough, the lower portion having an outer projecting ring formation, a circular opening therein, at the top having a sectional segment adapted to move laterally outward and to expand the opening within the same, said sectional segment being held in slidable contact by hinged pivotal connection with metal straps pivotally mounted at the ends, one to the segmental section and one to the exterior of the body member, a lug projecting outward from the exterior of the crown of the segmental section, and having pivotally mounted therein a pivoted lever, one end of which is pivotally mounted in connection with the parts of the segmental section and pivoted midway by and extending through a biforated lug on an exterior of the body member, its lower end having pivotally mounted therein a head in cam formation resting against the side of the body member, and its outer end projecting into a handle for the operation of the same.

2. In a quick connecting means for fire hydrants, and hose coupling, a body member having an opening therethrough, and at its upper end a segmental section forming a part of the sides of the opening, through the body member, held pivotally in sliding position outward by two parallel levers, one end pivotally mounted to the segmental section, and one end pivotally mounted to the side of the body member, thereby permitting the opening and expanding of the top of the opening to the body member, sectional ring sections projecting outward from the interior of the body member, and the segmental section, a flexible disc of rubber or leather material, having at its lower edge projecting inward a shoulder around the same on the interior adapted to press against and be pressed against by the entrance of a hydrant nipple entering the expanding opening of the body member, and adapted to be pressed against and pressed outward by the hydrant nipple and pressing inward on its outer side by the contact movement of the segmental section from leverage pressure on the outside of the body member.

3. In a quick connecting means for fire hydrants and hose coupling in combination, a body member having an opening therein extending through the same, the walls at the top having a semicircular segment let therein, forming a semicircular space extending downward from the top for a space, a semicircular member fitted in said space and adapted to be horizontally moved outward from the semicircle, expanding the opening in the top, a lever on the exterior of the body member pivotally uniting with said segment at its top and pivotally uniting at its bottom with the outer surface of the member, an outer projection from said segment to which is pivotally connected the lever pivoted in its connection and pivoted on a lug projecting from the member body, and having at its lower end a cam formation pivoted to the lever and on which is mounted a handle, all adapted by the movement of the handle to produce a leverage movement which will move outward and inward horizontally, the semicircular segment body.

4. In a quick connecting means for fire hydrants and hose coupling and the like, a coupling member having a threaded socket to receive the nipple of the fire hydrant, the end of the coupling being cut away, a segment, complementary to the end of the nipple, a pair of links pivotally secured to the coupling and to the segment to permit said segment to be moved bodily toward and away from the coupling member, a lever fulcrumed on the coupling member and being secured at one end to the segment, an operating handle pivotally secured to the other end of the lever, and a cam on the operating handle for engaging the coupling member to secure the segment in complementary position.

ROLLAND B. LESLIE.